United States Patent [19]
Staker et al.

[11] 3,938,022
[45] Feb. 10, 1976

[54] DC TO DC INVERTER CIRCUIT

[75] Inventors: William C. Staker, Springfield; Richard N. Lehnhoff, Dayton, both of Ohio

[73] Assignee: General Motors Corporation, Detroit, Mich.

[22] Filed: Aug. 28, 1974

[21] Appl. No.: 501,024

[52] U.S. Cl. ............... 321/2; 321/45 C; 321/45 ER
[51] Int. Cl.² ........................................ H02M 3/315
[58] Field of Search ............ 321/2, 45 R, 45 C, 16, 321/45 ER, 44; 307/252 M

[56] References Cited
UNITED STATES PATENTS

| | | | |
|---|---|---|---|
| 2,220,747 | 11/1970 | Westendorp | 321/36 |
| 3,315,144 | 4/1967 | Poss | 321/45 R |
| 3,406,329 | 10/1968 | French | 321/45 R |
| 3,543,131 | 11/1970 | Johnston | 321/45 ER |

OTHER PUBLICATIONS (S 2712 0018), Record, Power Conditioning Specialists Conference, Pasedena Calif. Apr. 19, 20, 1971, pp. 86–93, 321–322.

*Primary Examiner*—William M. Shoop
*Attorney, Agent, or Firm*—Richard G. Stahr

[57] ABSTRACT

The terminal ends of a center tapped primary transformer winding are connected to the positive polarity direct current input terminal through the anode-cathode electrodes of respective power silicone controlled rectifiers which are alternately triggered conductive and the center tap is connected to the negative polarity direct current input terminal. Simultaneously with each power silicon controlled rectifier, a corresponding commutating capacitor charge circuit silicon controlled rectifier is triggered conductive to establish a charge circuit for the corresponding commutating capacitor across the direct current input terminals. Each power silicon controlled rectifier is commutated not conductive by the charge upon the corresponding commutating capacitor applied in an inverse polarity relationship across the anode-cathode electrodes thereof through a commutating silicon controlled rectifier. The transformer secondary winding output is rectified and filtered to supply a direct current potential to a connected load.

6 Claims, 1 Drawing Figure

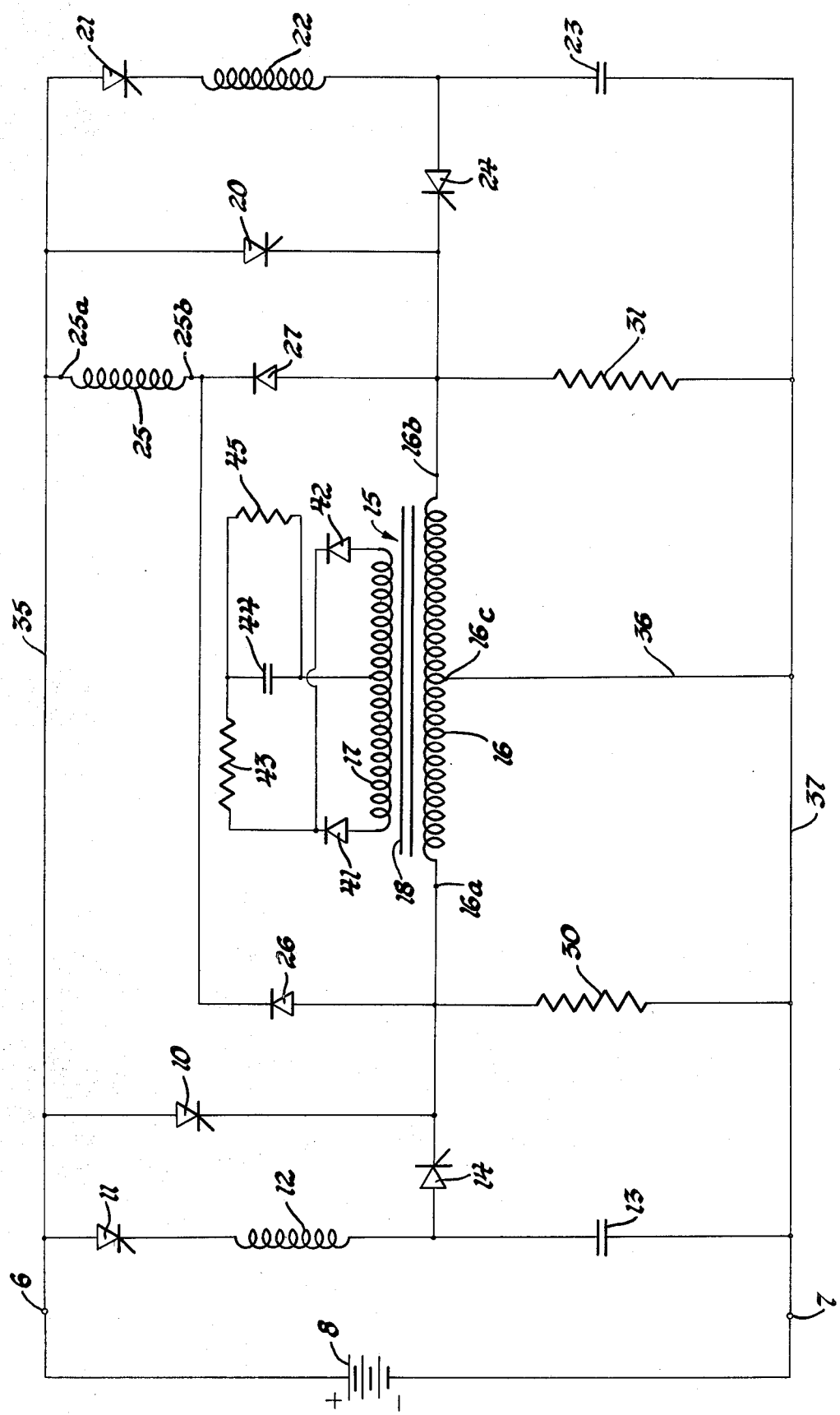

DC TO DC INVERTER CIRCUIT

This invention is directed to a DC to DC inverter circuit and, more specifically, to a DC to DC inverter circuit which obtains the commutating potential from the direct current supply.

Most prior art single phase inverter circuits obtain commutation energy from the load, subject the power silicon controlled rectifiers to voltage spikes which may be of the order of four times supply voltage and are so arranged that a given power silicon controlled rectifier is commutated by virtue of triggering an associated power silicon controlled rectifier conductive. Because the commutating energy is obtained from the load, a given power silicon controlled rectifier of most prior art inverter circuits has but one chance to commutate and these circuits can operate only within a small range of loads and power factors. Furthermore, the fact that the prior art inverter circuits commutate a given power silicon controlled rectifier not conductive by triggering an associated power silicon controlled rectifier conductive, these prior art inverter circuits are not adaptable to pulse width modulation. Therefore, the provision of a novel DC to DC inverter circuit which obviates these disadvantages of the prior art DC to DC inverter circuits is desirable.

It is, therefore, an object of this invention to provide an improved DC to DC inverter circuit.

It is an additional object of this invention to provide an improved DC to DC inverter circuit wherein the commutating energy is obtained from the supply potential.

In accordance with this invention, an improved DC to DC inverter circuit is provided wherein the center tap of a center tapped primary transformer winding is connected to the negative polarity direct current input terminal and the terminal ends are connected to the positive polarity direct current input terminal through respective power silicon controlled rectifiers which are alternately triggered conductive simultaneously with a corresponding charge circuit silicon controlled rectifier through which a charge circuit is established for a corresponding commutating capacitor across the direct current input; each power silicon controlled rectifier is commutated not conductive by the charge upon the corresponding commutating capacitor applied in an inverse polarity relationship across the anode-cathode electrodes thereof through a corresponding commutating silicon controlled rectifier and the output of the secondary transformer winding is rectified and filtered to supply a direct current potential to a connected load.

For a better understanding of the present invention, together with additional objects, advantages and features thereof, reference is made to the following description and accompanying single FIGURE drawing wherein the novel DC to DC inverter circuit of this invention is set forth in schematic form.

Without intention or inference of a limitation thereto, the direct current supply potential source is illustrated in FIG. 1 as a conventional storage battery 8. It is to be specifically understood, however, that the novel DC to DC inverter circuit of this invention may be used with any other direct current supply potential source.

As the trigger signal circuitry per se does not enter into this invention and since many trigger signal circuit arrangements well known to those skilled in the art may be employed with the novel inverter circuit of this invention, in the interest of reducing drawing complexity, trigger signal circuitry is not illustrated in the FIGURE.

The novel DC to DC inverter circuit of this invention is provided with positive and negative polarity direct current input circuitry which may be positive polarity direct current input circuit terminal 6 and negative polarity direct current input circuit terminal 7. It is to be specifically understood that input circuit terminals are not absolutely necessary as any circuit arrangement suitable for connecting the DC to DC inverter circuit of this invention to a source of direct current supply potential may be employed or the circuit may be directly connected to the source of direct current supply potential without departing from the spirit of the invention.

Each terminal end, 16a and 16b, of center tapped primary winding 16 of transformer 15 is connected to the same one of the direct current input circuit terminals through the anode-cathode electrodes of a corresponding power silicon controlled rectifier, respective power silicon controlled rectifiers 10 and 20, and the transformer primary winding center tap 16c is connected to the other one of the direct current input circuit terminals. For the purpose of describing the novel DC to DC inverter circuit of this invention and without intention or inference of a limitation thereto, terminal ends 16a and 16b of center tapped primary transformer winding 16 are shown in the FIGURE to be connected to the positive polarity direct current input circuit terminal 6 through the anode-cathode electrodes of respective power silicon controlled rectifiers 10 and 20 and supply lead 35 and the center tap 16c is connected to the negative polarity direct current input circuit terminal 7 through leads 36 and 37.

The series combination of the anode-cathode electrodes of a charge circuit silicon controlled rectifier 11, a charge circuit inductor element 12 and a commutating capacitor 13, which corresponds to power silicon controlled rectifier 10, and the series combination of the anode-cathode electrodes of another charge circuit silicon controlled rectifier 21, another charge circuit inductor element 22 and another commutating capacitor 23, which corresponds to power silicon controlled rectifier 20, are separately connected across the positive and negative polarity direct current input circuitry through respective leads 35 and 37 to provide respective charge circuits for commutating capacitors 13 and 23.

The anode-cathode electrodes of a commutating silicon controlled rectifier 14, which corresponds to power silicon controlled rectifier 10, are connected between the plate of commutating capacitor 13 which becomes positively charged through the previously described charge circuit therefor and the cathode electrode of power silicon controlled rectifier 10 an the anode-cathode electrodes of another commutating silicon controlled rectifier 24, which corresponds to power silicon controlled rectifier 20, are connected between the plate of c ommutating capacitor 23 which becomes positively charged through the previously described charge circuit therefor and the cathode electrode of power silicon controlled rectifier 20.

One terminal end 25a of an inductor element 25 is connected to one of the direct current input circuit terminals, positive polarity input circuit terminal 6 through lead 35, and the cathode electrode of each of commutating silicon controlled rectifiers 14 and 24 is connected to the other terminal end 25b of inductor element 25 through respective diodes 26 and 27.

Terminal ends 16a and 16b of transformer primary winding 16 are connected to the same polarity direct current input circuit terminal to which the center tap 16c is connected, negative polarity direct current input circuit terminal 7, through respective resistors 30 and 31.

Power silicon controlled rectifier 10 and charge circuit silicon controlled rectifier 11 are simultaneously triggered conductive to establish, respectively, across battery 8, the energizing circuit for that portion of transformer primary winding 16 between terminal end 16a and center tap 16c and the charge circuit for commutating capacitor 13. Upon the completion of these two circuits, energizing current begins to build up through that portion of the transformer primary winding 16 between terminal end 16a and center tap 16c at a rate determined by transformer parameters and connected load to produce an expanding magnetic flux which induces an increasing potential in secondary winding 17 of transformer 15 and a potential of the opposite polarity in the other half of the transformer primary winding between center tap 16c and terminal end 16b and commutating capacitor 13 begins to charge through inductor element 12. When commutating capacitor 13 has become fully charged, charge circuit silicon controlled rectifier 11 self-commutates not conductive as there is no longer sufficient holding current to maintain this device conductive. At this time, commutating capacitor 13 is charged with a positive polarity potential upon the plate thereof connected to inductor element 12 of a value greater than the supply potential of battery 8 by an amount determined by the Q of the LC charging network. In a practical application of the circuit of this invention, inductor element 12 has an inductance value of 4 millihenrys and commutating capacitor 13 has a capacitance value of ten microfarads. With these values, the charging current pulse width of commutating capacitor 13 is approximately 200 microseconds and the commutating capacitor 13 potential may ring up to about twice the supply potential, depending upon the load. After commutating capacitor 13 has become fully charged and charge circuit silicon controlled rectifier 11 has self-commutated to the not conductive condition, commutating silicon controlled rectifier 14 may be triggered conductive to place the charge of approximately twice the supply potential in an inverse polarity relationship across the anode-cathode electrodes of power silicon controlled rectifier 10 to reverse bias this device. At the same time, diode 26 becomes forward biased and discharges commutating capacitor 13 through inductor element 25 and the supply circuit until the potential of commutating capacitor 13 is equal to the supply potential, at which point diode 26 is no longer forward biased and ceases to conduct. The period of time during which diode 26 is conductive is essentially the shut-off time for power silicon controlled rectifier 10. Inductor element 25 is employed to lengthen this time to assure that power silicon controlled rectifier 10 is commutated not conductive. In a practical application of the novel inverter circuit of this invention, inductor element 25 had an inductance value of 120 microhenrys. After power silicon controlled rectifier 10 has been commutated not conductive, the remaining charge upon commutating capacitor 13 discharges through commutating silicon controlled rectifier 14 and that portion of the primary winding 16 of transformer 15 between terminal ends 16a and center tap 16c. When the discharge current from commutating capacitor 13 reaches 0, commutating silicon controlled rectifier 14 self-commutates not conductive. As commutating capacitor 13 discharges through the inductance of the portion of primary winding 16 between terminal end 16a and center tap 16c, capacitor 13 receives a charge in the reverse direction with the plate thereof connected to inductor 12 being of a negative polarity with respect to the opposite plate. With light or no secondary load, this reverse polarity charge may be as high as the supply potential, consequently, charge silicon controlled rectifier 11, when not conductive, must be capable of withstanding a potential of as high as twice the supply potential across the anode-cathode electrode thereof.

After commutating silicon controlled rectifier 14 has self-commutated not conductive, power silicon controlled rectifier 20 and charge circuit silicon controlled rectifier 21 are simultaneously triggered conductive to establish, respectively, across battery 8, the energizing circuit for the portion of transformer primary winding 16 between terminal end 16b and center tap 16c and the charge circuit for commutating capacitor 23. Upon the completion of these two circuits, energizing current begins to build up through that portion of the transformer primary winding 16 between terminal end 16b and center tap 16c at a rate determined by transformer parameters and connected load to produce an expanding magnetic flux which induces an increasing potential in secondary winding 17 of transformer 15 and a potential of opposite polarity in the other half of the transformer primary winding between center tap 16 and terminal end 16a and commutating capacitor 23 begins to charge through inductor element 22. When commutating capacitor 23 has become fully charged, charge circuit silicon controlled rectifier 21 self-commutates not conductive as there is no longer sufficient holding current to maintain this device conductive. At this time, commutating capacitor 23 is charged with a positive polarity potential upon the plate thereof connected to inductor element 22 of a value greater than the supply potential of battery 8 by an amount determined by the Q of the LC charging network. In a practical application of the circuit of this invention, inductor element 22 has an inductance value of 4 millihenrys and commutating capacitor 23 has a capacitance value of 10 microfarads. With these values, the charging current pulse width of commutating capacitor 23 is approximately 200 microseconds and the commutating capacitor 23 potential rings up to about twice the supply potential. After commutating capacitor 23 has become fully charged and charge circuit silicon controlled rectifier 21 has self-commutated to the not conductive condition, commutating silicon controlled rectifier 24 may be triggered conductive to place the charge of approximately twice the supply potential in an inverse polarity relationship across the anode-cathode electrodes of power silicon controlled rectifier 20 to reverse bias this device. At the same time, diode 27 becomes forward biased and discharges commutating capacitor 23 through inductor element 25 and the supply circuit until the potential of commutating capacitor 23 is equal to the supply potential, at which point diode 27 is no longer forward biased and ceases to conduct. The period of time during which diode 27 is conductive is essentially the shut-off time for power silicon controlled rectifier 20. Inductor element 25 is employed to lengthen this time to assure that power silicon controlled rectifier 20 is commutated not conductive. After power silicon controlled rectifier 20 has been commutated not conductive, the remaining charge upon commutating capacitor 23 discharges through commutating silicon controlled rectifier 24 and that portion of the primary winding 16 of transformer 15 between terminal ends 16b and center tap 16c. When the discharge current from commutating capacitor 23 reaches 0, commutating silicon controlled rectifier 24 self-commutates not conductive. As commutating capacitor 23 discharges through the inductance of the portion of primary winding 16 between terminal end 16b and center tap 16c, capacitor 23 receives a charge in the reverse direction with the plate thereof connected to inductor element 22 being of a negative polarity with respect to the opposite plate. With light or no secondary load, this reverse polarity charge may be as high as the supply potential, consequently, charge silicon controlled rectifier 21, when not conductive, must be capable of withstanding a potential of as high as twice the supply potential across the anode-cathode electrode thereof.

After commutating silicon controlled rectifier 24 has self-commutated not conductive, power silicon controlled rectifier 10 and charge circuit silicon controlled rectifier 11 may be simultaneously triggered conductive. The sequence of events just described is repeated so long as power silicon controlled rectifiers 10 and 20 are alternately triggered conductive, each simultaneously with respective charge circuit silicon controlled rectifiers 11 and 21. From this description, it is obvious that a potential pulse is induced in secondary winding 17 during each conduction period of power silicon controlled rectifier 10 and power silicon controlled rectifier 20 and that while these devices are alternatively triggered conductive, a series of potential pulses of opposite polarity is induced in secondary winding 17. These potential pulses are full-wave rectified by diodes 41 and 42, connected in a well known full-wave rectifier circuit configuration with center tapped secondary winding 17, and the rectified potential is filtered by series resistor 43 and filter capacitor 44. That is, the output of secondary winding 17 is rectified and filtered to supply an output direct current potential of a magnitude proportional to the frequency of the pulses induced in secondary winding 17. For this reason, the direct current output potential of the DC to DC inverter circuit of this invention may be conveniently regulated by pulse width modulating the periods of and space of time between conduction of power silicon controlled rectifiers 10 and 20. This rectified and filtered direct current output potential may be applied to any electrical load which is adaptable for energization by a direct current potential. In FIG. 1, the electrical load is represented by a resistor 45, however, it is to be specifically understood that any other electrical load which may be energized by a direct current potential source may be employed.

As power silicon controlled rectifiers 10 and 20 are triggered conductive by short duration trigger pulses, it is necessary that resistors 30 and 31 be provided to complete a circuit for latching current for respective power silicon controlled rectifiers 10 and 20 during periods of light load when the transformer circuit is highly inductive. In a practical application of a circuit of this invention, resistors 30 and 31 were of the order of 1 kilohm.

Each of commutating capacitors 13 and 23 may be charged with a negative voltage upon the plate connected to the respective inductor elements 13 and 23 at the conclusion of the commutation cycle as hereinbefore brought out. Therefore, these capacitors must be of the alternating current type.

For the proper operation of the novel inverter circuit of this invention, it is desirable that the current in the two primary winding halves decay to 0 as quickly as possible after each power silicon controlled rectifier 10 or 20 has been commutated not conductive. If the current in one side has not returned to 0, a voltage will be induced in the opposite side that will tend to prevent the power silicon controlled rectifier on that side from turning on. This may be a problem with light or no secondary load. In a practical application of the novel inverter circuit of this invention, the core 18 of transformer 15 included a one-sixteenth inch air gap which provided a much more rapid time constant for current delay which permits low load operation at higher inverter frequencies.

There are several characteristics of the novel DC to DC inverter circuit of this invention that set it apart from more conventional types and which make it an excellent circuit for use as a high reliability stand-by power supply, as follows:

1. The Ability to Recover from a Commutation Fault

Most single-phase inverter types take their commutation energy from the load. If a given power silicon controlled rectifier fails to turn off, the load circuit conditions change so that commutation energy is no longer available. In these other inverter circuits, a given power silicon controlled rectifier has but one chance to commutate; and a result of a miscommutation is inevitably a blown fuse.

On the other hand, the novel DC to DC inverter circuit of this invention takes its commutation energy from the direct current supply independently of load. If a power silicon controlled rectifier for some reason fails to commutate, the commutation circuit tries again one cycle later. In fact, this inverter can be latched up by removing the power silicon controlled rectifier triggers and will recover once the gate drive is reapplied.

2. Commutation Independent of Load Level and Power Factor

Most inverter configurations that take commutation energy from the load can operate over only a small range of loads and power factors. For example, the well-known "parallel capacitor commutated inverter" must have a commutating capacitor reactance greater than the load inductive reactance.

Again, the novel DC to DC inverter circuit of this invention is free from such problems because the commutation energy is handled independent of load. Changing the load level from no load to a short circuit on the transformer secondary (at reduced input voltage) causes only a 5 microseconds decrease in shut-off time. With changes in the inductor elements 12 and 22 and commutating capacitors 13 and 23, the circuit is capable of commutating very large load currents.

3. Low Silicon Controlled Rectifier Voltages

Any inverter configuration with a center-tapped load must switch voltages equal to 2E, but some types have voltage spikes as high as 4E at certain loads. The diodes 26 and 27 clamp the voltages on the transformer primaries at plus or minus E (except for the inductor 25 di/dt during the commutation interval).

4. The Ability to be Pulse-Width Modulated

In most single-phase silicon controlled rectifier inverters, a given power silicon controlled rectifier is commutated by virtue of triggering the opposite side power silicon controlled rectifier. Since in the novel DC to DC inverter circuit of this invention, the power silicon controlled rectifiers may be commutated at any point in time by triggering the associated commutating silicon controlled rectifier, the power silicon controlled rectifier conduction time can be controlled. This feature makes possible a convenient means of voltage regulation by pulse width modulating the circuit. That is, the power silicon controlled rectifiers may be rendered conductive for various periods of time and at various rates, as required by the application.

What is claimed is:

1. A DC to DC inverter circuit comprising: positive and negative polarity input circuit means; a transformer having at least a primary winding with two terminal ends and a center tap; first and second power silicon controlled rectifiers, each having anode and cathode electrodes; means for connecting each terminal end of said transformer primary winding to the same one of said input circuit means through the said anode-cathode electrodes of a respective one of said power silicon controlled rectifiers; means for connecting said transformer primary winding center tap to the other one of said input circuit means; first and second commutating capacitors; first and second charge circuit silicon controlled rectifiers, each having anode and cathode electrodes; first and second charge circuit inductor elements; means for separately connecting the series combination of said anode-cathode electrodes of one of said charge circuit silicon controlled rectifiers, one of said charge circuit inductor elements and one of said commutating capacitors and the series combination of said anode-cathode electrodes of the other one of said charge circuit silicon controlled rectifiers, the other one of said charge circuit inductor elements and the other one of said commutating capacitors across said positive and negative polarity input circuit means; a commutating silicon controlled rectifier having anode and cathode electrodes corresponding to each one of said power silicon controlled rectifiers; and means for connecting said anode-cathode electrodes of each of said commutating silicon controlled rectifiers across the positively charged plate of a respective one of said commutating capacitors and the said cathode electrode of the said power silicon controlled rectifier to which it corresponds.

2. A DC to DC inverter circuit comprising: positive and negative polarity input circuit means; a transformer having a primary winding with two terminal ends and a center tap and a secondary winding; first and second power silicon controlled rectifiers, each having anode and cathode electrodes; means for connecting each terminal end of said transformer primary winding to the same one of said input circuit means through the said anode-cathode electrodes of a respective one of said power silicon controlled rectifiers; means for connecting said transformer primary winding center tap to the other one of said input circuit means; first and second commutating capacitors; first and second charge circuit silicon controlled rectifiers, each having anode and cathode electrodes; first and second charge circuit inductor elements; means for separately connecting the series combination of said anode-cathode electrodes of one of said charge circuit silicon controlled rectifiers, one of said charge circuit inductor elements and one of said commutating capacitors and the series combination of said anode-cathode electrodes of the other one of said charge circuit silicon controlled rectifiers, the other one of said charge circuit inductor elements and the other one of said commutating capacitors across said positive and negative polarity input circuit means; a commutating silicon controlled rectifier having anode and cathode electrodes corresponding to each one of said power silicon controlled rectifiers; means for connecting said anode-cathode electrodes of each of said commutating silicon controlled rectifiers across the positively charged plate of a respective one of said commutating capacitors and the said cathode electrode of the said power silicon controlled rectifier to which it corresponds; and means for rectifying and filtering the output of said transformer secondary winding.

3. A DC to DC inverter circuit comprising: positive and negative polarity input circuit means; a transformer having at least a primary winding with two terminal ends and a center tap; first and second power silicon controlled rectifiers, each having anode and cathode electrodes; means for connecting each terminal end of said transformer primary winding to said positive polarity input circuit means through the said anode-cathode electrodes of a respective one of said power silicon controlled rectifiers; means for connecting said transformer primary winding center tap to said negative polarity input circuit means; first and second commutating capacitors; first and second charge circuit silicon controlled rectifiers, each having anode and cathode electrodes; first and second charge circuit inductor elements; means for separately connecting the series combination of said anode-cathode electrodes of one of said charge circuit silicon controlled rectifiers, one of said charge circuit inductor elements and one of said commutating capacitors in that order and the series combination of said anode-cathode electrodes of the other one of said charge circuit silicon controlled rectifiers, the other one of said charge circuit inductor elements and the other one of said commutating capacitors in that order across said positive and negative polarity input circuit means; a commutating silicon controlled rectifier having anode and cathode electrodes corresponding to each one of said power silicon controlled rectifiers; and means for connecting said anode-cathode electrodes of each of said commutating silicon controlled rectifiers across the positively charged plate of a respective one of said commutating capacitors and the said cathode electrode of the said power silicon controlled rectifier to which it corresponds.

4. A DC to DC inverter circuit comprising: positive and negative polarity input circuit means; a transformer having a primary winding with two terminal ends and a center tap and a secondary winding; first and second power silicon controlled rectifiers, each having anode and cathode electrodes; means for connecting each terminal end of said transformer primary winding to said positive polarity input circuit means through the said anode-cathode electrodes of a respective one of said power silicon controlled rectifiers; means for connecting said transformer primary winding center tap to said negative polarity input circuit means;

first and second commutating capacitors; first and second charge circuit silicon controlled rectifiers, each having anode and cathode electrodes; first and second charge circuit inductor elements; means for separately connecting the series combination of said anode-cathode electrodes of one of said charge circuit silicon controlled rectifiers, one of said charge circuit inductor elements and one of said commutating capacitors in that order and the series combination of said anode-cathode electrodes of the other one of said charge circuit silicon controlled rectifiers, the other one of said charge circuit inductor elements and the other one of said commutating capacitors in that order across said positive and negative polariity input circuit means; a commutating silicon controlled rectifier having anode and cathode electrodes corresponding to each one of said power silicon controlled rectifiers; means for connecting said anode-cathode electrodes of each of said commutating silicon controlled rectifiers across the positively charged plate of a respective one of said commutating capacitors and the said cathode electrode of the said power silicon controlled rectifier to which it corresponds; and means for rectifying and filtering the output of said transformer secondary winding.

5. A polarity to DC inverter circuit comprising: positive and negative polarity input circuit means; a transformer having at least a primary winding with two terminal ends and a center tap; first and second power silicon controlled rectifiers, each having anode and cathode electrodes; means for connecting each terminal end of said transformer primary winding to the same one of said input circuit means through the said anode-cathode electrodes of a respective one of said power silicon controlled rectifiers; means for connecting said transformer primary winding center tap to the other one of said input circuit means; first and second commutating capacitors; first and second charge circuit silicon controlled rectifiers, each having anode and cathode electrodes; first and second charge circuit inductor elements; means for separately connecting the series combination of said anode-cathode electrodes of one of said charge circuit silicon controlled rectifiers, one of said charge circuit inductor elements and one of said commutating capacitors and the series combination of said anode-cathode electrodes of the other one of said charge circuit silicon controlled rectifiers, the other one of said charge circuit inductor elements and the other one of said commutating capacitors across said positive and negative polarity input circuit means; a commutating silicon controlled rectifier having anode and cathode electrodes corresponding to each one of said power silicon controlled rectifiers; means for connecting said anode-cathode electrodes of each of said commutating silicon controlled rectifiers across the positively charged plate of a respective one of said commutating capacitors and the said cathode electrode of the said power silicon controlled rectifier to which it corresponds; first and second diodes; and inductor element having two terminal ends; means for connecting one terminal end of said inductor element to one of said input circuit means; means for connecting said cathode electrode of each of said commutating silicon controlled rectifiers to the other said terminal end of said inductor element through a respective one of said first and second diodes; first and second resistors; and means for connecting each said terminal end of said transformer primary winding to the same polarity input circuit means to which said primary winding center tap is connected through a respective one of said first and second resistors.

6. A DC to DC inverter circuit comprising: positive and negative polarity input circuit means; a transformer having a primary winding with two terminal ends and a center tap and a secondary winding; first and second power silicon controlled rectifiers, each having anode and cathode electrodes; means for connecting each terminal end of said transformer primary winding to said positive polarity input circuit means through the said anode-cathode electrodes of a respective one of said power silicon controlled rectifiers; means for connecting said transformer primary winding center tap to said negative polarity input circuit means; first and second commutating capacitors; first and second charge circuit silicon controlled rectifiers, each having anode and cathode electrodes; first and second charge circuit inductor elements; means for separately connecting the series combination of said anode-cathode electrodes of one of said charge circuit silicon controlled rectifiers, one of said charge circuit inductor elements and one of said commutating capacitors and the series combination of said anode-cathode electrodes of the other one of said charge circuit silicon controlled rectifiers, the other one of said charge circuit inductor elements and the other one of said commutating capacitors across said positive and negative polarity input circuit means; a commutating silicon controlled rectifier having anode and cathode electrodes corresponding to each one of said power silicon controlled rectifiers; means for connecting said anode-cathode electrodes of each of said commutating silicon controlled rectifiers across the positively charged plate of a respective one of said commutating capacitors and the said cathode electrode of the said power silicon controlled rectifier to which it corresponds; first and second diodes; an inductor element having two terminal ends; means for connecting one terminal end of said inductor element to said positive polarity input circuit means; means for connecting said cathode electrode of each of said commutating silicon controlled rectifiers to the other said terminal end of said inductor element through a respective one of said first and second diodes; first and second resistors; and means for connecting each said terminal end of said transformer primary winding to said negative polarity input circuit means through a respective one of said first and second resistors; and means for rectifying and filtering the output of said transformer secondary winding.

* * * * *

UNITED STATES PATENT AND TRADEMARK OFFICE
CERTIFICATE OF CORRECTION

PATENT NO. : 3,938,022

DATED : February 10, 1976

INVENTOR(S) : William C. Staker and Richard N. Lehnhoff

It is certified that error appears in the above-identified patent and that said Letters Patent are hereby corrected as shown below:

Title page, under ABSTRACT, line 4, "silicone" should read -- silicon --.
Col. 2, line 55, "an" should read -- and --;
line 59, "c ommutating" should read -- commutating --.
Col. 9, line 25, "polarity" should read -- DC --.

Signed and Sealed this eighteenth Day of May 1976

[SEAL]

Attest:

RUTH C. MASON
Attesting Officer

C. MARSHALL DANN
Commissioner of Patents and Trademarks